US011878572B2

(12) United States Patent
Tebib et al.

(10) Patent No.: US 11,878,572 B2
(45) Date of Patent: Jan. 23, 2024

(54) COOLING SYSTEM FOR STORING AND COOLING PRODUCTS DURING TRANSPORT ON A REFRIGERATED TRANSPORT VEHICLE (71) Applicant: Messer SE & Co. KGaA, Bad Soden (DE)

(72) Inventors: Emir Tebib, Le Plessis Belleville (FR); Denis Beil, Niederkassel (DE); Frank Gockel, Velbert (DE); Rémi Antoye, Davezieux (FR); Germain Blauvac, Davezieux (FR)

(73) Assignee: Messer SE &Co. KGaA, Bad Soden (DE)

( * ) Notice: Subject to any disclaimer, the term of this patent is extended or adjusted under 35 U.S.C. 154(b) by 89 days.

(21) Appl. No.: 17/422,637

(22) PCT Filed: Dec. 17, 2019

(86) PCT No.: PCT/EP2019/085680
§ 371 (c)(1),
(2) Date: Jul. 13, 2021

(87) PCT Pub. No.: WO2020/156736
PCT Pub. Date: Aug. 6, 2020

(65) Prior Publication Data
US 2022/0089001 A1 Mar. 24, 2022

(30) Foreign Application Priority Data
Jan. 28, 2019 (EP) ..................................... 19153888

(51) Int. Cl.
B60H 1/32 (2006.01)

(52) U.S. Cl.
CPC ......... *B60H 1/3235* (2013.01); *B60H 1/3202* (2013.01); *B60H 1/3226* (2013.01); *B60H 1/3232* (2013.01); *B60H 2001/3241* (2013.01)

(58) Field of Classification Search
CPC .. B60H 1/3235; B60H 1/3202; B60H 1/3226; B60H 1/3232; B60H 2001/3241; F25D 11/003
See application file for complete search history.

(56) References Cited

U.S. PATENT DOCUMENTS

| 1,989,609 | A | 1/1935 | Rice, Jr. |
| 2,123,678 | A | 7/1938 | Madden |

(Continued)

FOREIGN PATENT DOCUMENTS

| CN | 103496311 B | 2/2016 |
| EP | 1659355 A2 | 5/2006 |

(Continued)

OTHER PUBLICATIONS

International Search Report and Written Opinion issued in corresponding PCT Application No. PCT/EP2019/085680, dated Mar. 20, 2020.

*Primary Examiner* — Marc E Norman
(74) *Attorney, Agent, or Firm* — Andrus Intellectual Property Law, LLP (57) ABSTRACT A cooling system using carbon dioxide as a coolant comprises a cooling chamber for storing products to be cooled during transport and a cooling unit for cooling the atmosphere in the cooling chamber. The cooling chamber and the cooling unit are mounted on or integrated in a cooling vehicle like a truck, a railway wagon or a ship. The cooling unit comprises a carbon dioxide storage compartment and at least one cooling channel through which air is led from and to the cooling chamber. The carbon dioxide storage compartment and the cooling channel are separated from each (Continued)

other by a thermal well-conducting but gas-tight plate serving as a heat exchanger between the carbon dioxide in the carbon dioxide storage compartment and the air in the cooling channel.

18 Claims, 3 Drawing Sheets

(56) References Cited

U.S. PATENT DOCUMENTS

| | | | | |
|---|---|---|---|---|
| 2,730,871 | A | * | 1/1956 | Maclean .................. F25D 3/125 |
| | | | | 62/434 |
| 2,731,807 | A | | 1/1956 | Allyne |
| 4,553,584 | A | | 11/1985 | Bloomquist |
| 5,872,721 | A | * | 2/1999 | Huston .................. A23B 7/148 |
| | | | | 702/24 |
| 6,109,058 | A | | 8/2000 | Franklin, Jr. |

FOREIGN PATENT DOCUMENTS

| | | | |
|---|---|---|---|
| EP | 2384916 | A1 | 11/2011 |
| FR | 3031171 | A1 | 7/2016 |
| FR | 3034511 | A1 | 10/2016 |
| FR | 3058206 | A1 | 5/2018 |
| GB | 2275098 | A | 8/1994 |
| WO | WO 2011141287 | A1 | 11/2011 |

\* cited by examiner

COOLING SYSTEM FOR STORING AND COOLING PRODUCTS DURING TRANSPORT ON A REFRIGERATED TRANSPORT VEHICLE

CROSS-REFERENCE TO RELATED APPLICATIONS

This application is the U.S. national stage application of International Application No. PCT/EP2019/085680, filed Dec. 17, 2019, which International Application was published on Aug. 6, 2020, as International Publication WO 2020/156736 in the English language. The International Application claims priority to European Application No. 19153888.3, filed Jan. 28, 2019. The International Application and European Application are hereby incorporated herein by reference, in their entireties.

FIELD

The invention refers to a cooling system for storing and cooling products during transport on a refrigerated transport vehicle. The invention further refers to a transport vehicle equipped with a cooling system.

BACKGROUND

Refrigerated transport vehicles such as refrigerated trucks or refrigerated railway wagons are equipped with cooling systems for transporting temperature-sensitive products. Usually, such a cooling system comprises a cooling chamber or several cooling chambers mounted on a chassis or integrated in the body of the vehicle in which temperature sensitive goods are stored during transport at a temperature of e.g. 4° C. to 10° C. or, in the case of frozen goods, at temperatures below 0° C. For cooling the atmosphere in the cooling chamber mostly refrigeration units based on conventional compression refrigeration machines are used. However, the use of such conventional apparatuses use have increasingly been criticized due to their high noise emission and the high pollutant emissions of the diesel generators normally used for power generation of the compressor.

As an alternative, a cryogenic medium, e.g. liquid nitrogen or liquid $CO_2$, can be used as a cooling agent for cooling the atmosphere in the cooling chamber. The cryogenic coolant is stored within a thermal insulated storage tank on board of the vehicle and is fed to the cooling chamber when needed. For chilling the cooling chamber the coolant either is sprayed into the chamber in gaseous or liquid form (direct cooling), or it is brought into indirect thermal contact with the atmosphere by means of a heat exchanger mounted inside the cooling chamber. Examples for such transport cooling systems are described e.g. in WO 2011/141287 A1, EP 1 659 355 A2, GB 2 275 098 A or EP 2 384 916 A2. The filling of the coolant tank of a refrigerated truck is usually done from a stationary storage tank in which the coolant is stored in liquid form under cryogenic conditions.

Refrigerated trucks using liquid nitrogen or liquid $CO_2$ as coolant need an enlarged thermally well insulated tank mounted on the side or underneath the truck chassis. While they are increasingly being installed in larger vehicles their use in smaller refrigerated vehicles or delivery vans is hardly economically feasible due to the high dead weight of the tanks and safety considerations.

From FR 3 034 511 A1 a cooling system for transport trucks based on carbon dioxide as coolant is known. The system comprises a cooling unit arranged in the roof space of a cooling chamber, which includes a storage for dry ice and a plate made of thermally conductive material with cooling fins on the underside, which acts as a heat exchanger at which the atmosphere of the cooling chamber is directly cooled. The disadvantage of this system is that it is difficult to control the temperature in the cooling chamber. For this reason, it is proposed in FR 3 058 206 A1 to vary the cooling surface of the heat exchanging plate by means of a movable shutter. However, the installation of such a shutter is very laborious and increases the susceptibility of the cooling system to faults.

SUMMARY

Therefore, it is the aim of the present invention to provide a cooling system based on cryogenic cooling using carbon dioxide as coolant, which works reliably, is easy to install and is particularly suitable for installation in smaller refrigerated trucks or delivery vans.

This aim is achieved with a cooling system comprising the features of claim 1.

Advantageous embodiments of the invention are claimed in the subclaims.

Thus, according to the invention, a cooling system for storing and cooling products during transport on a refrigerated transport vehicle comprises a cooling chamber for receiving goods to be cooled and a cooling unit, said cooling unit having a carbon dioxide storage compartment equipped with thermally well insulated walls and a supply line for feeding liquid carbon dioxide into the carbon dioxide storage compartment, said supply line opens out inside the carbon dioxide storage compartment at an expansion device and has, at its end portion opposite to the expansion device, a connection piece for detachably connecting an liquid carbon dioxide filling device, said cooling unit further having an exhaust pipe for removing gaseous carbon dioxide from the carbon dioxide storage compartment and gas-permeable but particle-impermeable filter means for preventing carbon dioxide snow particles in the carbon dioxide storage compartment from entering the exhaust pipe, said cooling unit further having an air cooling compartment comprising at least one cooling channel which has an inlet opening into which a cooling air supply line opens which is flow-connected to the cooling chamber for feeding cooling air from the cooling chamber into the cooling channel, and which has an outlet opening at which a cooling air outlet line opens which is flow connected to the cooling chamber for feeding cooling air from the cooling channel into the cooling chamber, and said cooling unit further having a heat exchanger surface at which the carbon dioxide storage compartment and the cooling channel/s are thermally well conductive but gas-tightly connected to each other.

According to the invention, the cooling unit serves to cool the air in the cooling chamber using the cold content of carbon dioxide, without carbon dioxide entering the cooling chamber. It comprises two thermally, but not fluidly, connected sections, the carbon dioxide storage compartment on one hand and the air cooling compartment, which is not identical with the cooling chamber on the other. The air cooling compartment comprises a cooling channel or a plurality of cooling channels each of which is fluidly connected to the cooling chamber and thermally, but not fluidly, connected to the carbon dioxide storage compartment. The carbon dioxide storage compartment is filled with carbon dioxide snow by feeding liquid carbon dioxide having approximately ambient temperature and a pressure of more than 5.18 bar (e.g. 6-20 bar) via the supply line and expanding it within the carbon dioxide storage compartment. This leads to a mixture of carbon dioxide snow and carbon dioxide gas, the latter of which is exhausted via the exhaust pipe whereas the carbon dioxide snow is retained in the carbon dioxide storage compartment.

Cooling channel and cooling chamber are fluidly connected to each other via lines, which transport air from the cooling chamber into the cooling channel and back from the cooling channel into the cooling chamber. The flow of air through the cooling channel can easily be varied by means of fans, blowers, pumps or the like which may be installed in the cooling channel or in at least one of the lines leading thereto. On contact with the heat exchanger surface, heat from the air in the cooling channel is transferred to the carbon dioxide snow present in the carbon dioxide storage compartment. The heat transfer causes the carbon dioxide to sublimate gradually. The resulting gas is led to the outer atmosphere via the exhaust pipe. In this way, even walk-in cooling chambers, e.g. cooling chambers mounted on a transport vehicle, can be cooled without endangering the user due to sublimating carbon dioxide.

A preferred embodiment of the invention is characterized in that the expansion device is a nozzle arrangement, which is equipped with at least two nozzle heads each having nozzles pointing towards one another and arranged essentially horizontal, with an angle between 0-45° towards to the horizontal, within the carbon dioxide storage compartment. The nozzles serve for expanding liquid carbon dioxide into a mixture of carbon dioxide gas and carbon dioxide snow. Due to the special arrangement of the nozzles the carbon dioxide snow is evenly distributed in the carbon dioxide storage compartment.

In another advantageous embodiment of the invention, the exhaust pipe is equipped with means for maintaining an overpressure in the carbon dioxide storage compartment. The overpressure in the carbon dioxide storage compartment prevents the entering of ambient air. Of course, it will be necessary in this case that the connection piece for connecting a liquid carbon dioxide filling device is also be designed in such a way that the ingress of ambient air is prevented. Thus, in each stage of operation of the cooling unit, an atmosphere essentially consisting of carbon dioxide prevails in the carbon dioxide storage compartment, which avoids clogging of the nozzles due to water ice and improves the cooling performance. The means for maintaining an overpressure in the carbon dioxide snow compartment comprise, e.g. a flap, a non-return-valve or a pressure retention valve.

In order to improve heat transfer from air in the cooling channel to the carbon dioxide snow it is advisable that the cooling channel, or at least one cooling channel, is equipped with baffles mounted perpendicular to the exchanger surface such that the air in the cooling channel is forced into an extended flow path along the heat exchanger surface. Also, the heat exchanger surface can be equipped with cooling fins in order to enhance the heat transfer.

Preferably, the, or each, cooling channel is equipped with means for conveying the cooling air through the cooling channel. Such means can be, e.g. a fan, a blower or an air pump mounted in the cooling channel or in at least one of the lines for feeding air to and/or from the cooling channel. In particular, such conveying means can also be used to regulate the flow of gas through the respective cooling channel and thus, to regulate the heat transfer from the cooling unit to the cooling chamber. For example, the power of the fan or blower can be varied depending on a temperature measured at suitable sensors in the cooling chamber and automatically controlled by a control unit.

Using the cooling system according to the invention, products can also be cooled at different temperatures during transport. For doing so, the cooling chamber is divided into a plurality of thermally separated compartments which can be each flow-connected to the cooling channel. Furthermore, means are provided for controlling the supply of cooling air into each of the compartments. Such means may be valves or flaps as well as separate fans for each compartment, which can be controlled automatically depending on the desired temperature in the respective compartment by a control unit. For example, a cooling system according to the invention can be used for cooling at the same time a first compartment filled with frozen products (at temperatures of about −18° C.) and a second compartment filled with fresh products (at temperatures between 2° C. and 10° C.) both mounted on the same transport vehicle.

In order to facilitate maintenance, a particularly advantageous embodiment of the invention provides that the cooling unit is arranged outside the cooling chamber, with the cooling air lines to and from the air cooling compartment passing through the walls of both, the cooling unit and the cooling chamber. In the case of trucks, for example, the cooling unit is mounted above the cab of the truck on a front side of the cooling chamber, or on top of the cooling chamber. It is also possible to place the cooling unit at a distance from the cooling chamber and to provide only a flow connection via the cooling air lines mentioned above. For example, the cooling unit can be located in the chassis of a road or rail transport vehicle. However, it is also within the scope of the invention that the cooling unit, including carbon dioxide storage compartment and air cooling compartment, is mounted inside the cooling chamber.

In another preferred embodiment of the invention, the exhaust pipe is equipped with heat exchanger means mounted inside the cooling chamber. Thus, the sublimated carbon dioxide, which is still at a low temperature, contributes to the cooling of the atmosphere in the cooling chamber.

It is advantageous to provide a fan in the cooling chamber for homogenizing the temperature of the atmosphere in the cooling area.

Furthermore, the cooling chamber may be equipped with a safety device, e.g. a carbon dioxide detector, which, in the event that the carbon dioxide content exceeds a predetermined limit, emits an audible and/or visual warning signal.

The cooling system according to the invention is suited for cooling products like foods or pharmaceutical products during their transport on transport vehicles. For this purpose, the cooling system may be mounted on or installed in a transport vehicle like a truck, a trailer, a delivery van, a railway wagon or within a ship. In the case of trucks, the cooling system according to the invention is particularly suitable for smaller trucks, i.e. having a cooling chamber (in technical term also known as "refrigerating box body") with volume between 2 $m^3$ and 80 $m^3$, preferably between 4 $m^3$ and 50 $m^3$, most preferably between 4 $m^3$ and 15 $m^3$, in which products can be transported at temperatures between −20° C. and +10° C. Of course, this design of the invention is not limited to this configuration. For example, there can also be several compartments in which products can be transported at different temperatures, or compartments in which frozen products are stored or compartments in which products are only kept fresh can be arranged at the front or rear of the vehicle It is also useful to provide a drainage system for draining condensate water from the cooling chamber.

Preferably, a heating system is provided in the cooling chamber in order to manage temperature to be able to compensate for low outside temperatures in winter.

In another advantageous embodiment of the invention, the cooling unit is manufactured in a way that the expansion device and/or the filter means can easily be maintained. This can be done, for example, by that the cooling unit is equipped with a removable lid in the case of maintenance, ensures easy accessibility of the filter means and/or the injection system without removing the cooling unit from the cooling compartment or the truck.

Thus, the present invention seeks also protection for refrigerated transport vehicles equipped with a cooling system according to the invention, like trucks, trailers, delivery vans, railway cooling wagons or ships, in which the cooling system is integrated in the vehicle body or mounted on the vehicle as a refrigerated box or as a container, and having in particular the ranges of volume and transport temperature mentioned above.

BRIEF DESCRIPTION OF THE DRAWINGS

A preferred embodiment of the invention will be explained in more detail in the drawings. In schematic views the drawings show.

DETAILED DESCRIPTION

Figure 1:
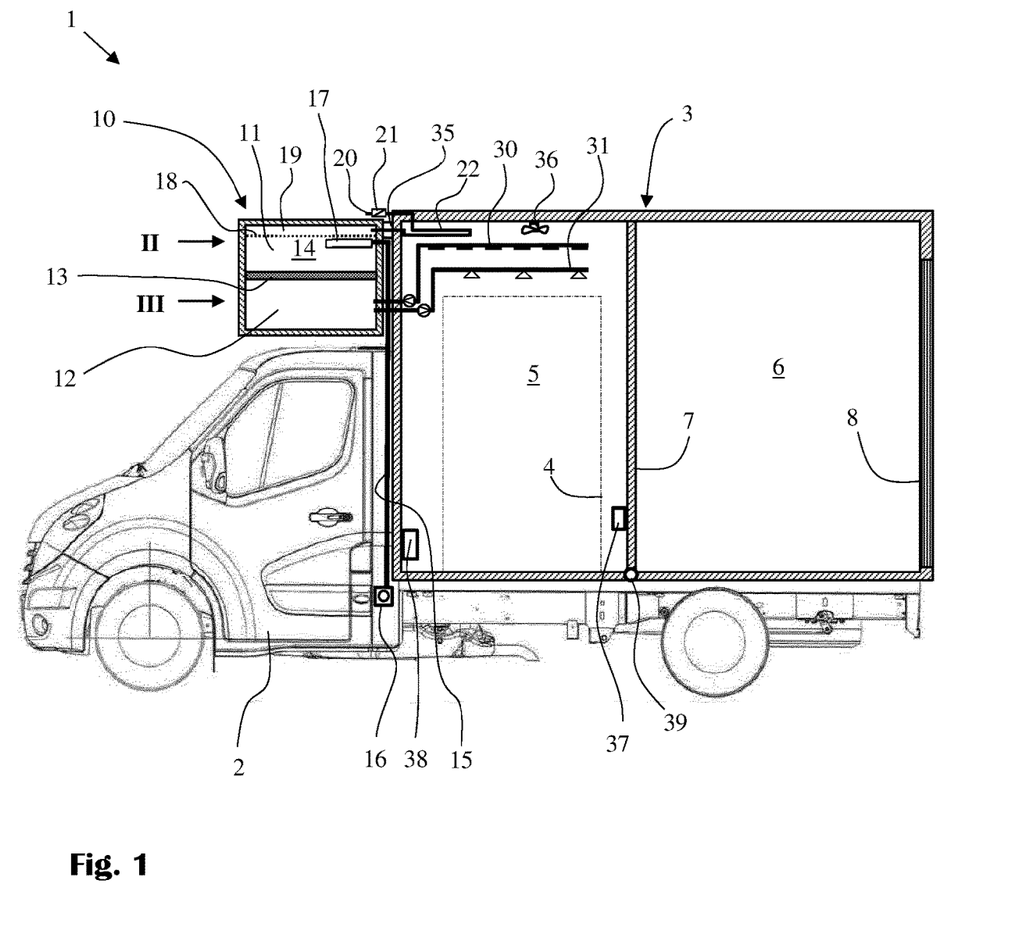
FIG. 1: A cooling system according to the invention mounted on a cooling truck in sectional view.

The cooling system 1 shown in FIG. 1 is fixedly mounted on the chassis of a transport vehicle, in the example of a truck 2. The cooling system 1 comprises a walk-in cooling chamber 3 having a volume of, e.g., 4 m$^3$-15 m$^3$ which is used for storing products needed to be cooled during transport, such as fresh or frozen foodstuffs, pharmaceuticals or other temperature-sensitive products. The cooling chamber 3 is equipped with thermally good insulating walls and is accessible via door 4, which here is only indicated by a dotted line.

Optionally, the cooling chamber 3 can be divided into several compartments 5, 6, each separated by a partition wall 7. For example, and shown in FIG. 1, a front compartment 5 and a rear compartment 6 can be provided, the latter being accessible through a rear door 8. By means of the separate compartments 5, 6 products can be transported at different temperatures. For example, the atmosphere in the compartment 5 is cooled, in the way described in detail below, to a temperature of, e.g., −18° C., or 5-10° C., while the atmosphere in compartment 6 is not or only slightly cooled due to the thermally insulated partition wall 7 and thus, is approximately at ambient temperature. It is, however, also within the framework of the present invention to provide several compartments within the cooling chamber, all of which are cooled in the manner described below, but at different temperatures. For example, there may be a first compartment in which products are cooled to freezing temperature (−18° C.) and a second compartment in which the products are kept fresh at a temperature of e.g. 2-10° C.

The cooling chamber 3 is cooled by means of a cooling unit 10 in which cold is produced by evaporating or sublimating carbon dioxide. The cooling unit 10 is divided vertically into two sections, namely, in its upper part, a carbon dioxide storage compartment 11 and a air cooling compartment 12 below, which are separated from each other by a gas-tight but thermally well-conducting separation plate 13 which may be, e.g., a metal plate.

The carbon dioxide storage compartment 11 comprises a space 14 for storing carbon dioxide snow. The feeding of carbon dioxide into space 14 is done by means of a carbon dioxide supply line 15, which is fixedly connected to the carbon dioxide storage compartment 11. The carbon dioxide supply line 15 is a pressure-resistant line for supplying liquid carbon dioxide. It begins at a connection piece 16 and ends inside the space 14 of the carbon dioxide storage compartment 11 at a nozzle arrangement 17. For safety reasons, the connection piece 16 is preferably located on a lower section of the truck 2 chassis, even—and especially—if the cooling unit 10 is mounted on top of the cooling chamber 3 or above the cab of the truck 2.

A filter 18 is arranged inside the space 14 above the nozzle arrangement 17, which extends horizontally through the entire space 14 and thus separates an upper gas space 19 within the space 14. From the gas space 19, an exhaust pipe 20 is led through the outer wall, e.g. through the top or a sidewall, of the cooling compartment 10. In order to prevent the ingress of ambient atmosphere into the space 14, the exhaust pipe 20 is equipped with a non-return valve 21, a flap or a pressure-maintaining valve, which guarantees a certain overpressure in the space 14 relative to the ambient atmosphere. The exhaust pipe 20 can optionally be passed through the cooling chamber 3 (as shown in the drawing) with a heat exchanger 22 where the cold sublimated carbon dioxide flowing through exhaust pipe 20 can absorb heat from the atmosphere inside the cooling chamber 3. For safety reasons, the gas exhaust pipe 20 may also open out into a lower area of truck 2 (not shown here).

Figure 2:
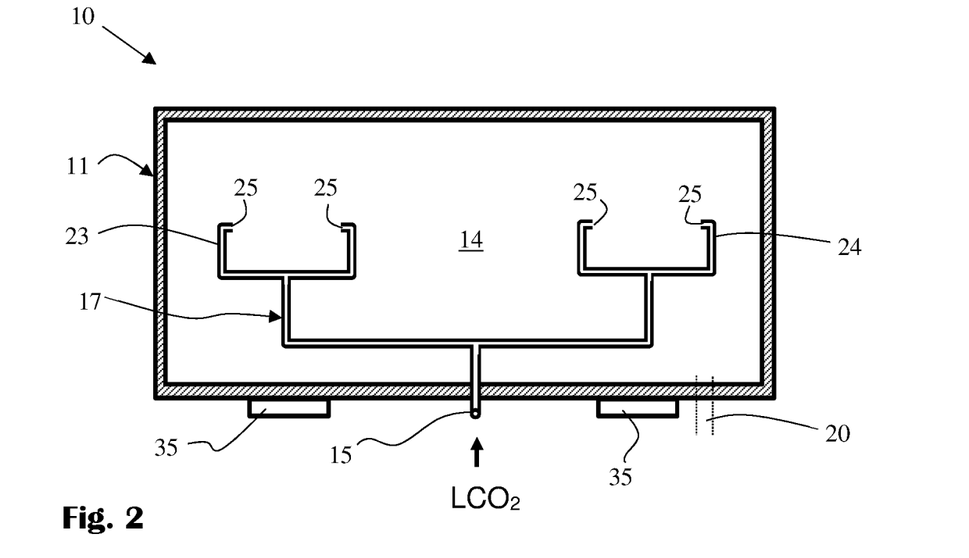
FIG. 2: The cooling unit of the cooling system shown in FIG. 1 in an enlarged sectional view along the horizontal plane II of FIG. 1, FIG. 3: The cooling unit of the cooling system shown in FIG. 1 in an enlarged sectional view along the horizontal plane III of FIG. 3.

The nozzle arrangement 17 is shown in more detail in FIG. 2. It extends within the space 14 and comprises two nozzle heads 23, 24 arranged symmetrically to each other, each equipped with two nozzles 25 directed towards each other. The nozzles 25, which are arranged approximately in a horizontal plane, are expansion nozzles, at which the liquid carbon dioxide, which is supplied via the carbon dioxide supply line 15, is expanded and transforms into a mixture of carbon dioxide gas and carbon dioxide snow.

Figure 3:
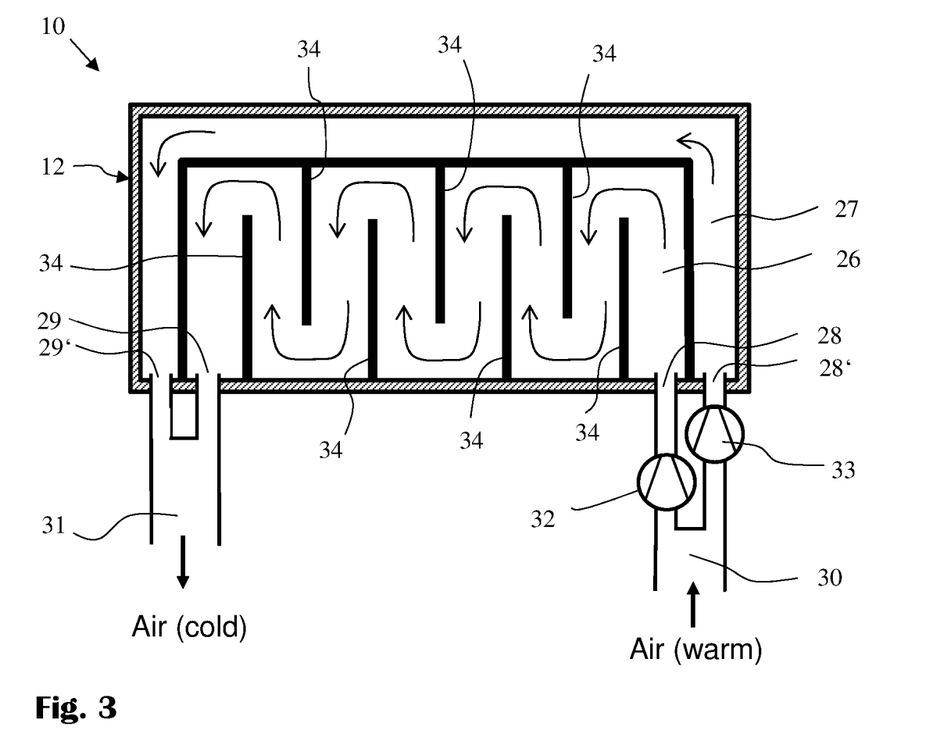

In FIG. 3, the air cooling compartment 12 of the cooling unit 10 is shown in more detail. As mentioned above, the air cooling compartment 12 is arranged below the carbon dioxide storage compartment 11 and separated from the latter by a thermally well conducting but gas-tight separation plate 13. The air cooling compartment 12 comprises—in the embodiment shown here—two cooling channels 26, 27, which extend through the air cooling compartment 12. Each cooling channel 26, 27 has an inlet opening 28, 28' and an outlet opening 29, 29' vertically spaced from each other. The inlet openings 28, 28' both are connected to a cooling air supply line 30 for feeding air to be cooled from the cooling chamber 3 into the air cooling compartment 12, and the outlet openings 29, 29' both are connected to a cooling air outlet line 31 for supplying cooled air from the air cooling compartment 12 to the cooling chamber 3. Both, the cooling air supply line 30 and the cooling air outlet line 31 lead to compartment 5 of cooling chamber 3 and exit there.

Each cooling channel 26, 27 is equipped with a fan, 32, 33 for conveying air through the respective cooling channel 26, 27. Within the cooling channel 26, a number of flow deflectors such as baffles 34 are arranged which lead to an extended flow path of the air along the separation plate 13. The fans 32, 33 can be mounted in the cooling channel 26, 27 within the air cooling compartment 12. However, for maintenance reasons it is advisable to place the fans 32, 33 outside the air cooling compartment 12 in front of the openings 28, 28', 29, 29', as shown in the FIG. 3 as an example in front of the openings 28, 28'. The fans 32, 33 can be operated separately by means of a control device not shown here.

For maintenance reasons the cooling unit 10 is preferably located outside the cooling chamber 3 and preferably mounted on its outer wall by means of suitable securing means 35. In the example shown in FIG. 1, the cooling unit 10 is located just above the cab of the truck 2. However, the cooling unit can also be mounted, for example, on the top of the cooling chamber 3 or in the area of the chassis of truck 2 and connected to cooling chamber 3 only via the lines 29, 30.

Furthermore, the cooling chamber 3 is equipped with a fan 36 working independently from the cooling unit 10 for homogenizing the temperature of the atmosphere in the cooling chamber 3. The cooling chamber 3 is also equipped with a carbon dioxide detector 37 for monitoring the carbon dioxide content inside the cooling chamber 3, which, in the event that the carbon dioxide content exceeds a predetermined limit, emits an audible and/or visual warning signal. The cooling chamber 3 further comprises a heater 38 for heating the cooling chamber, 3 if necessary, and a drainage system 39 for draining condensate water from the cooling chamber 3.

The cooling system 1 is operated as follows. Before using the cooling unit 10 for cooling products in the cooling chamber 3, the carbon dioxide storage compartment 11 has to be filled with carbon dioxide snow. For this purpose, the connection piece 16 is connected to a filling device for liquid carbon dioxide (not shown here) at a pressure of more than 5.18 bar. The liquid carbon dioxide flows through the supply line 15 and exits at the nozzles 25 into the carbon dioxide storage compartment 11, where it expands and passes into a mixture of carbon dioxide gas and carbon dioxide snow. During the feeding of the liquid carbon dioxide the filter 18 ensures that the carbon dioxide snow is retained within space 14, while the carbon dioxide gas escapes into the surrounding atmosphere via the exhaust pipe 20. Thereby, the non-return valve prevents moist ambient air from entering the carbon dioxide snow compartment 11. The special design of the nozzle arrangement 17 shown here allows an even distribution of the carbon dioxide snow within the space 14. After the carbon dioxide storage compartment 11 has been filled with a predetermined amount of carbon dioxide snow, the connection pipe 16 is separated from the filling device and is closed gas-tightly.

The carbon dioxide snow present in carbon dioxide storage compartment 11 cools the plate 13 and thus, also the air present in the air cooling compartment 12. By means of the fans 32, 33 air to be cooled is sucked or blown from the cooling chamber 3 into the air cooling compartment 12 via cooling air supply line 30, while cooled air is fed from the air cooling compartment 12 into the cooling chamber 3 via air outlet line 31. The baffles 34 are arranged such that the air inside the cooling channel 26 is forced through an elongated flow path of the air inside the cooling channel 26, thus leading to a relative long a contact time between the air passing through cooling channel 26 and the plate 13.

In a first operational mode, which may be the usual operational mode for keeping the atmosphere in the compartment 5 at its (low) temperature, only fan 32 is in operation and air from the cooling chamber 3 is led only through the cooling channel 26. In order to increase the efficiency of the cooling, e.g. for cooling down the atmosphere in the compartment 5 from ambient temperature to a preset temperature, the cooling channel 27 can be activated by switching on fan 33 in a second operational mode.

The operation of the fans 31, 32 is preferably controlled by a control device not shown here in dependence on the temperature prevailing in the compartment 5. In this way, the temperature in compartment 5 can be kept very precisely at a preset value during the whole transport.

Figure 4:
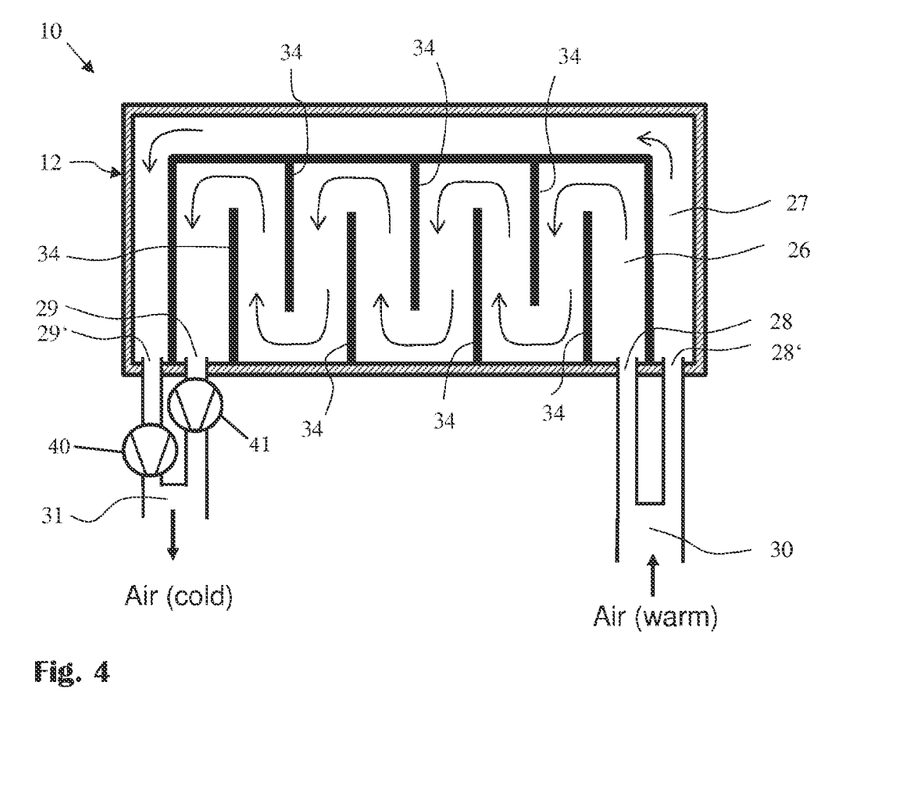
FIG. 4: A cooling unit in another embodiment in an enlarged sectional view.

FIG. 4 differs from FIG. 3 only in that the fans 31, 32 are replaced by blowers 40, 41 which blow the cold atmosphere from the cooling channel 27 into the cooling chamber 3. The mode of operation of the blowers 40, 41 is the same as that of the fans 31, 32.

REFERENCE LIST

1 Cooling system
2 Truck
3 Cooling chamber
4 Side door
5 Compartment
6 Compartment
7 Partition wall
8 Rear door
9 -
10 Cooling unit
11 Carbon dioxide storage compartment
12 Air cooling compartment
13 Separation plate
14 Space
15 Liquid carbon dioxide supply line
16 Connection piece
17 Nozzle arrangement
18 Filter
19 Gas space
20 Exhaust pipe
21 Non return valve
22 Heat exchanger
23 Nozzle head
24 Nozzle head
25 Nozzle
26 Cooling channel
27 Cooling channel
28, 28' Opening
29, 29' Opening
30 Cooling air supply line
31 Cooling air outlet line
32 Fan
33 Fan
34 Baffles
35 Securing means
36 Fan
37 Carbon dioxide detector
38 Heater
39 Drainage
40 Blower
41 Blower

The invention claimed is:

1. A cooling system for storing and cooling products during transport comprising:
   a cooling chamber for receiving goods to be cooled; and
   a cooling unit;
   wherein said cooling unit has a carbon dioxide storage compartment equipped with thermally insulated walls and a supply line for feeding liquid carbon dioxide into the carbon dioxide storage compartment, said supply line opening out inside the carbon dioxide storage compartment at a nozzle and, at its end portion opposite to the nozzle, being configured to be detachably connected to a source of liquid carbon dioxide;
   wherein said cooling unit further has an exhaust pipe for removing gaseous carbon dioxide from the carbon dioxide storage compartment and a gas-permeable but particle-impermeable filter for preventing carbon dioxide snow particles in the carbon dioxide storage compartment from entering the exhaust pipe, wherein the filter extends across the carbon dioxide storage compartment and separates a gas space from a remainder of the carbon dioxide storage compartment;
   wherein said cooling unit further has an air cooling compartment, comprising at least one cooling channel which has an inlet opening into which a cooling air supply line opens which is flow-connected to the cooling chamber for feeding cooling air from the cooling chamber into the at least one cooling channel and an outlet opening at which a cooling air outlet line opens which is flow-connected to the cooling chamber for feeding cooling air from the at least one cooling channel into the cooling chamber; and
   wherein said cooling unit further has a heat exchanger surface on which the carbon dioxide storage compartment and the at least one cooling channel are thermally conductive but gas-tightly connected to each other.

2. The cooling system according to claim 1, wherein the nozzle is equipped with at least two nozzle heads each pointing towards one another and arranged at an angle between 0-45° with respect to horizontal within the carbon dioxide storage compartment.

3. The cooling system according to claim 1, wherein the exhaust pipe is equipped with means for maintaining an overpressure in the carbon dioxide storage compartment.

4. The cooling system according to claim 1, wherein the at least one cooling channel is equipped with baffles and/or cooling fins for reinforcing the heat transfer.

5. The cooling system according to claim 1, wherein the at least one cooling channel is equipped with means for conveying the cooling air from the cooling chamber through the at least one cooling channel.

6. The cooling system according to claim 1, wherein the cooling chamber is divided into a plurality of thermally separated compartments which are each flow-connected to the air cooling compartment, and wherein means are provided for controlling the supply of cooling air into each of the compartments of the cooling chamber.

7. The cooling system according to claim 1, wherein the cooling unit is mounted on an outer wall of the cooling chamber or is arranged inside the cooling chamber.

8. The cooling system according to claim 1, wherein the exhaust pipe is equipped with heat exchanger means mounted inside the cooling chamber.

9. The cooling system according to claim 1, wherein the cooling chamber is equipped with a fan for homogenizing the temperature of the atmosphere in the cooling chamber.

10. The cooling system according to claim 1, wherein a carbon dioxide detector for monitoring the carbon dioxide content of the atmosphere is provided in the cooling chamber.

11. The cooling system according to claim 1, wherein the cooling chamber and the cooling unit are adapted to be mounted on a transport vehicle.

12. The cooling system according to claim 1, wherein a heater is provided in the cooling chamber and/or in the air cooling compartment.

13. The cooling system according to claim 1, wherein a drain is provided in the cooling chamber and/or in the air cooling compartment for draining condensate water.

14. The cooling system according to claim 1, wherein the cooling unit is manufactured in a way that the nozzle and/or the filter can be accessed for maintenance.

15. A transport vehicle, wherein the transport vehicle is equipped with a cooling system according to claim 1.

16. The cooling system according to claim 1, wherein the nozzle is equipped with at least two nozzle heads each pointing towards one another and arranged horizontally within the carbon dioxide storage compartment.

17. A cooling system for storing and cooling products during transport comprising:
   a cooling chamber for receiving goods to be cooled; and
   a cooling unit;
   wherein said cooling unit has a carbon dioxide storage compartment equipped with thermally insulated walls and a supply line for feeding liquid carbon dioxide into the carbon dioxide storage compartment, said supply line opening out inside the carbon dioxide storage compartment at a nozzle and, at its end portion opposite to the nozzle, being configured to be detachably connected to a source of liquid carbon dioxide;
   wherein said cooling unit further has an exhaust pipe for removing gaseous carbon dioxide from the carbon dioxide storage compartment and a gas-permeable but particle-impermeable filter for preventing carbon dioxide snow particles in the carbon dioxide storage compartment from entering the exhaust pipe, wherein the filter is located vertically between the nozzle and the exhaust pipe, the exhaust pipe is located above the filter, and the nozzle is located below the filter;
   wherein said cooling unit further has an air cooling compartment, comprising at least one cooling channel which has an inlet opening into which a cooling air supply line opens which is flow-connected to the cooling chamber for feeding cooling air from the cooling chamber into the at least one cooling channel and an outlet opening at which a cooling air outlet line opens which is flow-connected to the cooling chamber for feeding cooling air from the at least one cooling channel into the cooling chamber; and
   wherein said cooling unit further has a heat exchanger surface on which the carbon dioxide storage compartment and the at least one cooling channel are thermally conductive but gas-tightly connected to each other.

18. A cooling system for storing and cooling products during transport comprising:
   a cooling chamber for receiving goods to be cooled; and
   a cooling unit;
   wherein said cooling unit has a carbon dioxide storage compartment equipped with thermally insulated walls and a supply line for feeding liquid carbon dioxide into the carbon dioxide storage compartment, said supply line opening out inside the carbon dioxide storage compartment at a nozzle and, at its end portion opposite to the nozzle, being configured to be detachably connected to a source of liquid carbon dioxide;

wherein said cooling unit further has an exhaust pipe for removing gaseous carbon dioxide from the carbon dioxide storage compartment and a gas-permeable but particle-impermeable filter for preventing carbon dioxide snow particles in the carbon dioxide storage compartment from entering the exhaust pipe;

wherein said cooling unit further has an air cooling compartment, comprising at least one cooling channel which has an inlet opening into which a cooling air supply line opens which is flow-connected to the cooling chamber for feeding cooling air from the cooling chamber into the at least one cooling channel and an outlet opening at which a cooling air outlet line opens which is flow-connected to the cooling chamber for feeding cooling air from the at least one cooling channel into the cooling chamber;

wherein said cooling unit further has a heat exchanger surface on which the carbon dioxide storage compartment and the at least one cooling channel are thermally conductive but gas-tightly connected to each other; and wherein the exhaust pipe is equipped with means for maintaining an overpressure in the carbon dioxide storage compartment and the means for maintaining the overpressure is separate from the filter.

* * * * *